United States Patent [19]
Arnold

[11] 3,827,458
[45] Aug. 6, 1974

[54] DIVERTER VALVE FOR LIQUIDS
[75] Inventor: Don C. Arnold, Palatine, Ill.
[73] Assignee: Granda Corp., Alden, Ill.
[22] Filed: Nov. 22, 1972
[21] Appl. No.: 308,805

[52] U.S. Cl. ............................................... 137/610
[51] Int. Cl. ............................................. F16k 1/16
[58] Field of Search ........... 137/609, 610, 611, 612, 137/612.1

[56] References Cited
UNITED STATES PATENTS

| | | | |
|---|---|---|---|
| 2,720,214 | 10/1955 | Rupp et al. | 137/610 X |
| 3,329,171 | 7/1967 | Sibbald | 137/609 X |
| 3,331,394 | 7/1967 | Hefler et al. | 137/610 |
| 3,382,686 | 5/1968 | Hartley | 137/609 X |
| 3,542,058 | 11/1970 | Holzer | 137/611 X |
| 3,545,470 | 12/1970 | Paton | 137/610 X |
| 3,570,539 | 3/1971 | Herring | 137/612 X |
| 3,592,221 | 7/1971 | Worley | 137/612 X |
| 3,726,313 | 4/1973 | Pandya | 137/609 |

*Primary Examiner*—Henry T. Klinksiek
*Attorney, Agent, or Firm*—Edward U. Dithmar

[57] ABSTRACT

A diverter valve for liquids, usable for example in combination domestic tub and shower installations, having a hollow valve body with a supply port for pressurized liquid and a pair of spaced outlet ports communicating with ducts possessing upward and downward directionality. A valve stem for manual actuation is mounted rotatably on the valve body, the stem having a valving portion within the body adapted to be positioned to close the outlet port leading to the downward duct, thereby causing liquid flow through the outlet port leading to the upward duct. The valve stem is spring biased to a "rest" position such that the outlet port leading to the downward duct is open, permitting liquid to flow through such port and duct, and, due to hydraulic characteristics, precluding liquid flow through the other outlet port and associated upward duct. When the stem is rotated manually to close the outlet port communicating with the downward duct, the pressure in the liquid overcomes the spring bias and maintains the port closed until liquid flow through the supply port is stopped, at which time the valve reverts to "rest" condition.

3 Claims, 3 Drawing Figures

DIVERTER VALVE FOR LIQUIDS

CROSS-REFERENCE TO RELATED APPLICATION

The diverter valve of this application is disclosed broadly in co-pending application of Arnold and Ritzenthaler for *Bathtub Filler and Shower Appliance*, Ser. No. 299,716, filed Oct. 24, 1972.

BACKGROUND OF THE INVENTION

This invention relates to a diverter valve for liquids, and more particularly to a valve having a single supply port and a pair of alternately usable outlet ports. By way of example, a valve of this general type is used in combination domestic tub and shower installations.

A diverter valve of subject type ordinarily is used with a companion valve means for controlling liquid flow in a supply line or supply lines, for example supply lines of hot and cold water. In one operational setting of the diverter valve, for example the "rest" setting in the case of a tub and shower installation, the valve permits the flow of liquid through a tub spout to the bathtub. In the other operational setting, resulting from manual adjustment, the outlet port to the tub spout is closed and liquid flows through the other outlet port to the shower head. Pressure in the flowing liquid maintains the valve in this position until the flow of liquid is stopped by the companion valve, after which the diverter valve reverts automatically to the original "rest" setting.

SUMMARY OF THE INVENTION

The invention contemplates a diverter valve for liquids having a hollow valve body with a supply port for pressurized liquid and a pair of spaced outlet ports, sometimes referred to as upward and downward ports because the ducts associated with the respective ports have the indicated directionalities. A stem is mounted for rotation on the valve body, the stem having an actuating portion exterior of the body and a valving portion within the body.

A stop means is provided on the valve body for limiting rotation of the stem in one direction at a radial "rest" position such that the valving portion is remote from the downward outlet port, permitting flow through the downward outlet port, and thus precluding flow through the upward outlet port in view of hydraulic characteristics.

A spring means positioned between the valve body and the stem urges the stem to rotate into engagement with the stop means, thereby establishing the "rest" condition of the valve.

The stem is rotatable manually in opposition to the spring means to an alternative position such that the valving portion closes the downward outlet port, permitting liquid flow through the upward outlet port. In this alternative position of the stem, the hydraulic pressure in the liquid overcomes the spring means and maintains the downward outlet port closed until liquid flow in the supply port is stopped, at which time the spring means rotates the stem into "rest" engagement with the stop means.

In more detailed aspect, the spring means is a spiral spring disposed around the actuating portion of the stem exterior of the valve body, one end of the spring secured to the stem and the other end secured to the valve body.

The valving portion of the stem within the valve body includes an integral radial vane and a resilient member on the vane, the resilient member adapted to close the downward outlet port in sealing manner following manual rotation of the stem. Where the downward outlet port is closed, pressure in the liquid within the valve acts on the vane and resilient member and overcomes the tendency of the spring means to rotate the stem in direction to open the port.

DESCRIPTION OF THE PREFERRED EMBODIMENT

Figure 1:
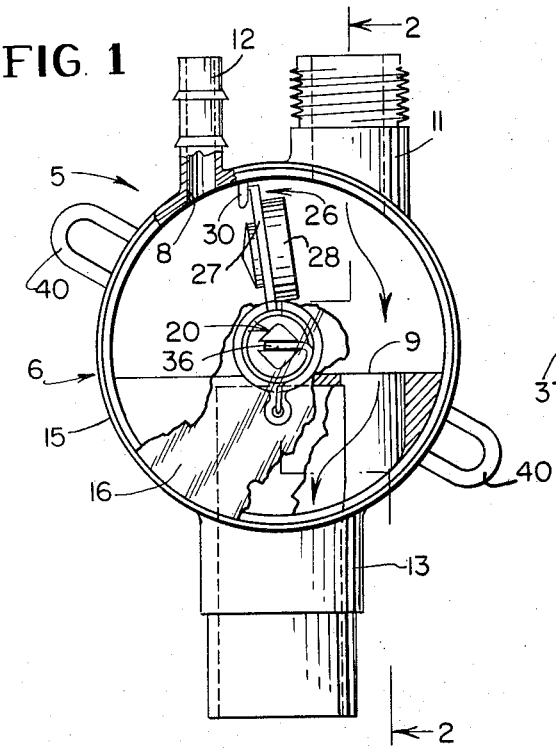
FIG. 1 is a front elevational view, partly broken away and partly in section, of a diverter valve embodying the invention, the valve being shown in "rest" condition.

Referring to the drawing, the illustrated diverter valve, generally designated 5, includes a hollow valve body 6 having a supply port 7 (FIG. 2), an upward outlet port 8 (FIG. 1) and a downward outlet port 9 spaced from upward outlet port 8.

Supply port 7 and upward and downward outlet ports 8 and 9, respectively, have connecting ducts 11, 12 and 13 which preferably are integral with valve body 6 and formed of molded plastic material. Outlet ducts 12 and 13 have the general directionality of upward and downward, respectively, this being the reason similar nomenclature is used with the associated ports 8 and 9, it being understood that the ports themselves do not have directionality. Duct 11 and associated supply port 7 are generally aligned vertically with downward outlet port 9, as shown in FIGS. 1–3.

Figure 2:
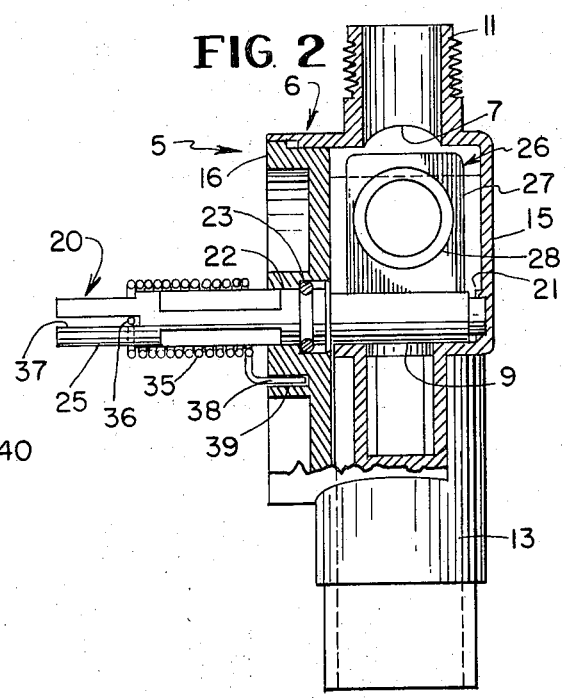
FIG. 2 is a side elevational view, partly in section on irregular line 2—2 of FIG. 1, of the diverter valve.
Figure 3:
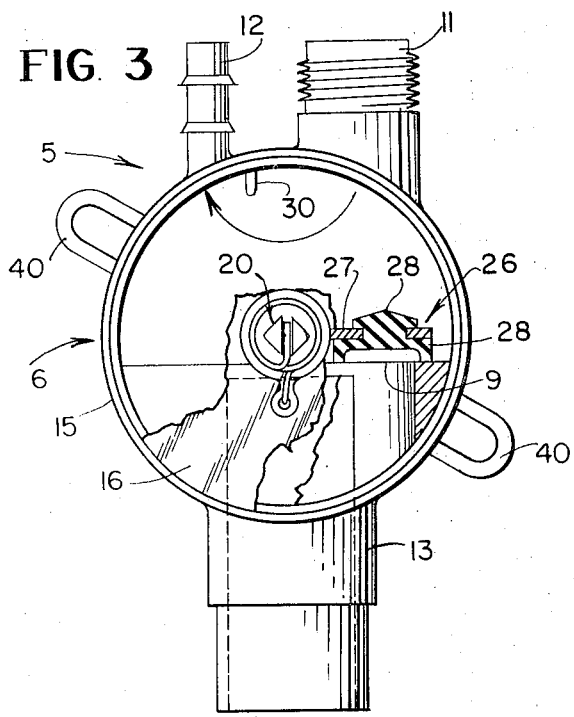
FIG. 3 is a front elevational view, partly broken away and partly in section, showing the alternative condition of the valve, compared with the condition shown in FIGS. 1 and 2.

As best shown in FIG. 2, valve body 6 has a main valve body part 15 including the integral ducts 11, 12 and 13 and a cover part 16 which on assembly is sealed to part 15 in liquid proof manner.

Again, as best shown in FIG. 2, diverter valve 5 has a stem 20 mounted for rotation on valve body 6, the inner end of stem 20 being journalled at 21 on valve body part 15, and an intermediate stem portion being journalled at 22 in cover part 16. Stem 20 extends completely through an opening in cover part 16, and a conventional 0-ring 23 or the like is provided to establish a liquid seal between cover part 16 and stem 20.

Stem 20 has an actuating portion 25 (FIG. 2) exterior of valve body 6 and a valving portion 26 within the valve body. A handle (not shown) is mounted rigidly on actuating portion 25.

Valving portion 26 includes a radial vane 27 integral with stem 20, and a resilient member 28, best shown in FIG. 3, which closes outlet port 9 in sealed manner, again as shown in FIG. 3.

Referring to FIGS. 1 and 3, valve body 6 has a stop means 30 within the valve body, which stop means limits rotation of stem 20 in one direction at a radial "rest" position such that valving portion 26 is remote from downward outlet port 9, permitting liquid flow through downward outlet port 9 and precluding flow through upward outlet port 8. This position of stem 20 and valving portion 26 is shown in FIG. 1.

In this "rest" condition, upward outlet port 8 is not sealed or closed, but liquid does not flow through port 8 because downward outlet port 9 is open and provides low hydraulic resistance to the flow of liquid through the valve, thereby reducing the pressure in the flowing liquid from that otherwise necessary to cause liquid flow through upward outlet port 8.

Referring again to FIG. 2, a spring means 35 is provided between valve body 6 and stem 20. As shown, spring means 35 is a spiral spring disposed around a part of actuating portion 25 of stem 20 exterior of valve body 6, the outer end 36 of spring means 35 being secured in a slot 37 of stem 20 and the inner end 38 of spring means 35 being secured in a recess 39 in cover part 16 of valve body 6.

Spring means 35 biases stem 20 in direction such that in "rest" condition of the valve, valving portion 26 of stem 20 engages stop means 30, as shown in FIG. 1. In this condition of the valve, as mentioned, fluid flows through downward outlet port 9 and, due to hydraulic characteristics, does not flow through upward outlet port 8.

Stem 20, by means of a handle omitted for clarity, is adapted to be rotated clockwise (FIGS. 1 and 3) in opposition to spring means 35 to an angular position where valving portion 26 closes downward outlet port 9, as shown in FIG. 3. In this position of stem 20 and valving portion 26, the pressure in the liquid overcomes the opposing bias of spring means 35 and maintains downward outlet port 9 closed until liquid flow through supply port 7 is stopped by means of a companion valve (not shown). When liquid flow through supply port 7 is stopped, liquid pressure no longer is present, and spring means 35 rotates stem 20 in counter clockwise direction until valving portion 26 thereof engages stop means 30, thereby restoring "rest" position and permitting subsequent liquid flow to exit through downward outlet port 9.

Mounting ears 40 (FIGS. 1 and 3), preferably integral with valve body 6, are provided to facilitate installation.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A diverter valve for liquids, comprising: a hollow valve body having a supply port for pressurized liquid and a pair of spaced upward and downward outlet ports, said supply port being generally aligned vertically with said downward outlet port;

a stem mounted for rotation on said valve body, said stem having an actuating portion exterior of said valve body and a valving portion within said valve body;

a stop means on said valve body for limiting rotation of said stem in one direction at a radial position with said valving portion remote from said downward outlet port, permitting liquid flow from said supply port through said vertically aligned downward outlet port and thus precluding flow through said upward outlet port;

spring means between said valve body and said stem urging said stem to rotate into engagement with said stop means;

said stem rotatable manually in opposition to said spring means whereby said valving portion closes said downward outlet port, permitting liquid flow through said upward outlet port, the pressure in the liquid overcoming said spring means and maintaining said downward outlet port closed until liquid flow through said supply port is stopped, at which time said spring means rotates said stem into engagement with said stop means.

2. The diverter valve of claim 1 wherein said spring means is a spiral spring disposed around said exterior actuating portion of said stem.

3. The diverter valve of claim 1 wherein said valving portion of said stem includes an integral radial vane, and with the addition of a resilient member on said vane, said resilient member adapted to close said downward outlet port in sealing manner following manual rotation of said stem.

* * * * *